United States Patent [19]

Hiss et al.

[11] 3,779,858

[45] Dec. 18, 1973

[54] THERMALLY STABLE NON-BLISTERING POLYIMIDE LAMINATES

[75] Inventors: Roger A. Hiss, Flushing, Mich.;
Harry E. Kime, Jr., Collingdale, Pa.

[73] Assignee: E. I. du Pont de Nemours and Company, Wilmington, Del.

[22] Filed: Sept. 24, 1971

[21] Appl. No.: 183,625

Related U.S. Application Data

[63] Continuation-in-part of Ser. No. 120,766, March 3, 1971, abandoned.

[52] U.S. Cl. ...... 161/170, 117/126 GB, 117/140 A, 117/161 P, 161/93, 161/156, 161/158, 161/197, 161/227, 161/DIG. 7
[51] Int. Cl. ........................................... B32b 17/10
[58] Field of Search .................. 161/87, 93, 156, 161/158, 170, 192, 197, 227, DIG. 7; 117/126 GB, 140 A, 161 P

[56] References Cited
UNITED STATES PATENTS

| | | | |
|---|---|---|---|
| 3,179,635 | 4/1965 | Frost et al. | 161/197 |
| 3,371,009 | 2/1968 | Traynor, Jr. et al. | 161/227 |
| 3,582,458 | 1/1971 | Haller | 161/197 |
| 3,616,196 | 10/1971 | Sun | 161/93 |
| 3,700,538 | 10/1972 | Kennedy | 161/93 |

*Primary Examiner*—William J. Van Balen
*Attorney*—Robert W. Black

[57] ABSTRACT

Non-blistering polyimide laminates are formed from polyimide precursor impregnated sheets wherein the resultant polyimide laminate has a void volume of at least about 3.5% and not more than about 10%, as measured by mercury intrusion method, and the voids exist substantially in and around the fabric layer.

8 Claims, No Drawings

THERMALLY STABLE NON-BLISTERING POLYIMIDE LAMINATES

RELATED APPLICATIONS

This application is a continuation-in-part of U.S. Ser. No. 120,766 filed Mar. 3, 1971, now abandoned.

BACKGROUND OF THE INVENTION

POlyimide laminates formed from a plurality of impregnated fibrous sheets are well known in the art. Their preparation usually involves a four-step process:
1. Preparing a precursor of the imide-containing polymer;
2. Impregnating a fibrous material with the precursor;
3. Partially converting the precursor that is impregnated in the fibrous material to an imide-containing structure; and
4. Laminating and consolidating the product of (3) by application of heat and pressure and/or vacuum.

A typical method for the preparation of polyimide laminates is described in Traynor, Jr. et al., U. S. Pat. No. 3,371,009, issued Feb. 27, 1968, the disclosure of which is hereby incorporated by reference.

Polyimide laminates thus prepared have many desirable characteristics such as their resistance to degradation at relatively high temperatures and their resistance to the passage of electrical current. When further laminated to metal surfaces, they are useful in circuit boards. However, at unusually high temperatures, i.e. in excess of 300°C. as can be encountered in use during fabrication of parts for circuit boards, these laminates of polyimide especially those prepared from solvent based systems, may blister and swell caused by the presence of volatiles within the cured polyimide which are vaporized by the high temperature. These volatiles can be residual solvent, water and other by-products of the polyimide reaction.

SUMMARY OF THE INVENTION

This invention is a structure such as a clad laminate comprising at least one layer of a fibrous sheet material impregnated with a polyimide, the voids in all such layers having a void volume of at least about 3.5 percent and not more than about 10 percent as measured by the mercury intrusion method, substantially all the voids occurring in and around the fibrous sheet material. The impregnated fibrous sheet material and laminate thereof absent cladding is also part of this invention.

The clad laminate, laminate or impregnated sheet material can contain inert colloidal particles which tend to assist volatile release and build viscosity at high temperatures. The fibrous sheet material is typically cloth of glass fiber. Most preferably the void volume is not greater than about 7 percent as measured by mercury intrusion.

By "clad" is meant that the laminate bears on at least part of at least one surface thereof a coating of a metal.

By impregnating the fibrous sheet material with care to control strike-through as taught herein and subsequently curing this sheet material, alone, or as a laminate, or clad laminate, or stagewise, there can be obtained the product of the present invention. As taught herein, by selecting the correct void volume for the size of clad laminate, laminate, or sheet material impregnated with polyimide, a structure which will not blister at temperatures of 300°C. or more may be obtained. It is thought that the percent voids as herein required are at least a measure of interconnecting voids providing for release of volatiles. The invention is therefore, especially of use with polyimides prepared from solvent based systems.

DESCRIPTION OF THE INVENTION

Polyimide prepared from polyamic-acid systems and such systems are described in Edwards U.S. Pat. No. 3,179,614, and Edwards U.S. Pat. No. 3,179,634, Lavin et al. U.S. Pat. No. 3,190,856 and Libackyj U.S. Pat. No. 3,541,036. Polyimide prepared from diesters and diamines and such diesters and diamines are described in Lavin et al. U.S. Pat. No. 3,347,808. The disclosure of these references is hereby incorporated in their entirety.

As is known in the art, such precursors include compositions of benzophenone tetracarboxylic acid and esters and anhydrides of such acids and diamines in an organic solvent.

Representative diamines include aliphatic primary diamines of from two to about six carbon atoms and aromatic primary diamines of from six to about 36 carbon atoms. Among such compounds that are useful for the practice of this invention are: 4,4'-isopropylidenedianiline, 4,4'-methylene-dianiline, benzidine, 3,3'-dichloro-benzidine, 4,4'-thiodianiline, 3,3'-sulfonyldianiline, 4,4'-sulfonyldianiline, 1,5-naphthalene diamine, 4,4'-(diethyl silylene) dianiline, 4,4'-(diphenyl silylene)-dianiline, 4,4'-diaminobenzophenone, 4,4'-(ethylphosphinylidene)-dianiline, 4,4'-(phenyl phosphinylidene) dianiline, 4,4'-(N-methylamine)dianiline, 4,4'-(N-phenylamino) dianiline and mixtures thereof, meta-phenylene-diamine, paraphenylene diamine, 2,6-diaminopyridine, 4,4'-methylenedicyclo-hexylamine, hexamethylene diamine, heptamethylene diamine, octamethylene diamine, nonamethylene diamine, decamethylene diamine, 1,4-cyclohexane diamine. The position isomers of these compounds such as the corresponding 2,2'-diamino, 3,3'-diamino and 3,4'-diamino compounds are also useful.

Any suitable inert organic solvent can be used and many illustrative ones are disclosed in the aforementioned Lavin et al. patent. Liquids such as N,N-dimethylformamide, N,N-dimethylacetamide and N-methyl-2-pyrrolidone are preferred. Other solvents which may be used in the present invention are: N,N-diethylformamide, N,N-diethylacetamide, N,N-dimethylmethoxyacetamide, N-methylcaprolactam, dimethyl sulfoxide, N-methyl-2-pyrrolidone, tetramethyleneurea, pyridine, dimethyl sulfone, hexamethylphosphoramide, tetramethylene sulfone, formamide, N-methylformamide, butyrolactone and N-acetyl-2-pyrrolidone, ketones such as methyl ethyl ketone, nitro-alkanes such as nitroethane, nitropropane, etc. The solvents can be used alone, in combinations of solvents, or in combination with poorer solvents such as benzene, benzonitrile, dioxane, xylene, toluene and cyclohexane.

Various fillers may be added with the precursor if desired. Suitable materials include colloidal particles of the following materials: carbon black, polyimide molding powder such as for example described in Shelbourne, U. S. Pat. NO. 3,249,588 issued May 3, 1966, titanium dioxide, barium titanate, potassium titanate, magnesium sulfate, asbestos, magnetic iron oxide ($Fe_3O_4$), ferric oxide ($Fe_2O_3$), aluminum powder, potassium sodium tartrate, ammonium dihydrogen phosphate, non-abrasive alumina and non-abrasive amorphous silica as in glass microballoons, preferably barium titanate. The class of non-abrasive silica also includes the various forms of "Ludox" colloidal silicas; "Celite" diatomaceous silica (largely $SiO_2$, plus $Al_2O_3$, $Fe_2O_3$, $TiO_2$, CaO and MgO); Synthamica (a synthetic mica made from a stoichiometric ratio of $SiO_2$, $Al_2O_3$, MgO, potassium silica fluoride and potash feldspar); "Hi-Sil" silica (a hydrated silica of high purity any very fine particle size); "Cab-O-Sil" colloidal silica; and sepiolite (meerschaum; a hydrated magnesium silicate). Some forms of non-abrasive alumina are bochmite (a form of bauxite, $Al_2O_3H_2O$); "Celite" diatomaceous silica (see above); and "Bentone" 18 (a magnesium/calcium/aluminum/silicon complex oxide attached electrovalently to an organic ammonium cation). Colloidal size silica has been found to be especially useful in the practice of this invention.

For reasons not fully understood the above colloidal size particles tend to act as solvent release agents and viscosity builders when the cured polyimide is exposed to very high temperatures, i.e. 300°C. and above, thereby reducing void content during curing as discussed in U.S. Ser. No. 779,630, filed Nov. 27, 1698, now abandoned, and U.S. Ser. No. 779,602, filed Nov. 27, 1968, now U.S. Pat. No. 3,616,196.

The type of voids minimized by addition of colloidal particles are not necessarily effective voids as required in this invention. Voids in the polyimide containing trapped vapor or other occluded "bubbles" are not voids of the type which would be determined by mercury intrusion. This is discussed in more detail hereinafter.

As will be apparent, large defect bubbles at the surface supplying large void volume are not voids within the scope of this invention.

The precursor may be admixed with the particles or the particles may be admixed with the precursor at any stage in the preparation of the precursor. For example, the particles may be admixed with the solution in the organic solvent of one or both of the reactants before, during or after the formation of the precursor, or the particles may be admixed with the organic solvent prior even to the introduction of the reactants of the precursor. Preferably, the particles are admixed with a solution of the polymeric precursor.

Suitable methods of mixing the polymeric precursor and the colloidal particles include normal and high speed stirring, sand milling as for example is described in Hochberg U. S. Pat. No. 2,581,414 issued Jan. 8, 1952 and Hochberg and Bosse U. S. Pat. No. 2,885,156 issued Oct. 7, 1958, ball milling, two roll milling, other methods used in the preparation of pigment dispersions, etc.

Various substrates suitable for resin impregnation include No. 104, No. 106, No. 107, No. 108, No. 112, No. 113, No. 116, No. 117, No. 119 and No. 128 weave glass fabric; heavier grades of glass fabric such as, for example, No. 181 weave; glass cloth wherein the yarn is not twisted and plied, such as No. 7781 and No. 7628 glass cloth all as defined in Industrial Woven Glass Fabrics and Tapes, Burlington Glass Fabrics Co. 7/22/68; glass sheets prepared from parallel glass fibers; glass fibers; asbestos fibers and sheets prepared from such fibers, and similar fibers and sheets prepared therefrom.

Also, materials of Nomex* (*Registered trademark to E.I. duPont de Nemours and Company) fibers can be used effectively.

Any suitable method can be used to impregnate the fibrous material, taking into account the desired percent void volume. For example, the fibrous material can be coated with the precursor composition by wire-wound rods or a knife edge or it can be immersed in such composition.

If the fibrous material is impregnated by means of dipping or immersion in a precursor solution, it may not be possible to achieve a desired coating thickness with only one coat. In such an instance it may be desirable to substantially cure the precursor already impregnated within the fibrous material before adding additional precursor layers. This procedure enhances solvent removal from the interior portion of the polyimide layer thereby facilitating solvent removal from subsequently prepared laminate. A fibrous sheet impregnated by a plurality of coats may be thermally cured at elevated temperature after each coat, except the last coat which should be only partially cured. This partial cure allows for better adhesion of the sheet during lamination.

Partial cure also can affect the degree of strike through of the polyimide precursor into the fabric and therefore can affect the ease with which the product of this invention can be prepared. As aforementioned products of this invention can be prepared by impregnating a fibrous sheet material with polyimide precursor with care taken to control strike through. Limited strike-through should be maintained throughout cure. Thus, a highly imidized resin with volatiles content less than 5 percent at the lamination stage is preferred. Further curing of the polyimide in the laminate without causing excessive flow into the fabric layer is accomplished typically between platens at about 500 psi to 1000 psi at curing temperatures. Curing under these conditions tends to minimize the presence of voids in the polyimide. Use of the highly imidized resin during lamination tends to prevent flow into the fabric. Thus, a desired void volume in the polyimide located substantially in and around the fibrous sheet material can be obtained from polyimide precursors which can be processed in this or equivalent fashion. Because polyamic-acid precursor systems can be readily laminated at low solvent content with minimal flow of the partially cured system, the polyamic-acid precursor route is preferred.

A vacuum bagging technique for forming polyimide laminates does not appear to be a desirable method for forming the product of this invention. Vacuum bagging requires substantial flow of the precursor during lamination and thus precursors used have a high solvent content to accomplish this. Further there is little pressure on the structure during vacuum bagging lamination. Thus vacuum bagged products would have more of a tendency to have voids distributed throughout the polyimide layer. Further, because of the flow during laminating, tendency for full strike-through is increased. Lower laminating temperatures tend to result in greater residual volatile content. These results are counter to that desired in the product of this invention.

In order to use laminates of this invention as circuit boards, nickel or copper sheets can be laminated to either or both sides as the outermost laminate layer. This is usually accomplished as a one-step lamination procedure whereby the impregnated sheets and metal sheet are simultaneously subjected to heat and pressure. In some instances, such as when using an impregnated sheet having a coarse or roughened surface, adhesion to the metal is reduced due to reduced surface area in contact with the metal. Face plies can be effectively used to rectify this problem, i.e., a fibrous sheet having an excess of polyimide resin, which is in intimate contact with the metal.

Treated copper — electrodeposited copper treated with cuprous oxide and nickel oxide—appears to give desired adhesion in cladding.

When impregnating fabric to prepare the product of this invention, the strike-through of the polyimide precursor should be controlled so that the finally cured polyimide impregnated product has void channels running through the fabric layer of the laminate. Without being bound thereby it is postulated that in the main volatiles evolved find the channels existing through the fabric layer and pass to the environment thereby escaping and avoiding blistering of the laminate. The invention is thus particularly applicable and has the demonstrated advantages when the polyimide is derived from a solvent based system. The voids are substantially all in the region in and around the fibrous sheet material. The location of the voids in the structure of this invention is based on stereoscan photo micrographs of cross sections of the polyimide laminates.

The voids in laminates of one embodiment of this invention are substantially in a size range of 0.05-30 microns as would appear from the mercry porosimeter (mercury intrusion) method although this may vary with the nature of the fibrous sheet material. Mercury porosimeter is described in I & EC, Vol. 41, pages 780-785 (1949) and ASTM Bul. No. 236, pages 39-44, February 1959, both disclosures of which are incorporated herein by reference. Below the 3.5 percent void volume level, volatiles do not appear to have sufficient escape routes to prevent blistering when clad laminates are exposed to very high temperatures of 300°C., 350°C., or even 400°C. such as in an oven at that temperature for laminates of sizes 3 × 3 inches face area.

A void content of not more than 10 percent and preferably not more than 7 percent is thought to be desired in electrical circuit board end uses. Strength decreases as void content increases due to lack of polyimide film integrity. Further, greater void volume would provide for significantly reduced support for circuitry. These properties must be balanced in view of the particular requirement of the finished product. To achieve a non-blistering result, greater void content of the structure may be necessary when the face surfaces are large than when the laminate is of smaller face area. For example, it has been found that 3.5percent void volume suffices for a laminate with copper foil on both faces of 3 × 3 inches in face dimensions; whereas, a similar laminate of 18 × 34 inches in face dimensions failed (blistered) under equivalent conditions with 3 ½ percent void volume but was non-blistering at 6 ½ percent void volume. Further, it is thought that length of channel for volatiles to escape may in part be determinative of the percent void volume required to provide a non-blistering laminate. These results are based on conditions equivalent to those thought to be in use in the circuit board industry whereby the boards are oven heated to about 300°C. In any event, these structures have a void content as measured herein of at least 3.5 percent as measured by mercury intrusion method.

Briefly, the mercury intrusion method relies on the relationship between resistance to flow in a capillary and the pressure required to cause flow.

A specimen is placed in a chamber which has provision for positive pressure and vacuum. The specimen is placed under mercury. There is provision for measuring the volume of mercury under any applied pressure. Starting with a vacuum state, pressure is increased in increments. At each pressure level time is permitted for equilibration and the volume of mercury is determined. The decrease in apparent mercury volume with an increment in applied pressure is the amount of mercury forced into the pores of the specimen. Each pressure level is associated with a given capilliary size range. The above procedure is repeated until no decrease in apparent mercury volume is noted in two successive pressure increments. The difference in mercury volume is the void volume of the sample having external outlet.

Volatiles content is determined by weight loss on exposure of the sample in an oven at 750° ± 10°F. for 2 ½ minutes.

Resin content is determined by weight difference after volatile content determination. The specimen is exposed in a muffle furnace at 1000°F. ± 25°F. for about 3 hours. This decomposes the resin. The remaining material is glass and inert additive if present. Weight difference before and after this exposure is weight of polyimide.

The invention will be more clearly understood by referring to the examples which follow. All parts are by weight unless otherwise specified.

EXAMPLE 1

A precursor solution was prepared by adding solid benzophenone tetracarboxylic dianhydride to an N-methyl pyrrolidone solution of metaphenylene diamine and stirring at 120°F. until the diamine was dissolved. The amount of diamine added was about a 1:1 molar equivalent of the benzophenone tetracarboxylic dianhydride content of the solution. The resin solids content of the solution was about 18 percent.

"Cab-O-sil" (trademark of the Cabot Corporation) colloidal silica in the amount of 10 percent by weight, based on the combined weight of the benzophenone tetracarboxylic acid and the metaphenylene diamine was then admixed with the precursor solution.

A No. 7628-E glass fabric was coated with the above precursor by passing it through the precursor and metering the coat with a number 35 wire-wound rod. The fabric was passed through the precursor solution four times and exposed to a partial cure temperature after each pass. During each pass the impregnated fabric was subjected to three different temperature zones on a vertical tower. The following table indicates the temperature and time:

| Tower Cure Temperature | Zone 1 (5 min.) | Zone 2 (5 min.) | Zone 3 (10 min.) |
|---|---|---|---|
| First pass | 225°F. | 300°F. | 450°F. |
| Second pass | 225°F. | 300°F. | 425°F. |
| Third pass | 225°F. | 300°F. | 400°F. |
| Fourth pass | 225°F. | 300°F. | 375°F. |

The final dry resin content of the impregnated fabric was 40.0 percent.

A laminate, copper clad on each side, was made from the aforementioned impregnated fabrics by laminating 8 plies of the impregnated fabric and 1 oz. treated copper in a press at 1400 p.s.i. at 500° to 550°F. for 30 minutes. The laminate was subjected to 300°C. for 48 hours and 400°C. for 45 minutes without blistering.

EXAMPLE 2

A polyimide precursor was preapred in accordance with the procedure of Example 1 except that oxydianiline was substituted for metaphenylene diamine and the glass fabric used was No. 112. The laminate produced did not exhibit any blistering after 45 hours exposure to 400°C.

EXAMPLE 3

A precursor solution was prepared by adding solid benzophenone tetracarboxylic dianhydride to an N-methyl pyrrolidone solution of metaphenylene diamine and stirring at 120°F. until the diamine was dissolved. The amount of diamine added was about a 1:1 molar equivalent to the anhydride. The resin solids content of the solution was between about 18–20 percent "Cab-O-Sil" (trademark of the Cabot Corporation) colloidal silica in the amount of 10 percent by weight, based on the combined weight of the benzophenone tetracarboxylic acid and the metaphenyl diamine was then mixed with precursor solution.

A No. 7628-E glass fabric of 7 mils thick with A-1100 finish was coated with the above precursor by passing it through the precursor and metering the coat with a knife or rod as given in the Table below. The fabric traveled upwards vertically between two knives or rods which were staggered. This coated fabric was then dried and cured in a three zone vertical tower at speeds and temperatures given in the Table below. This coating-drying process is done in five passes in order to build up to the final thickness of the product 9–10 mils. The table below summarizes the metering applicator for each pass, temperature and residence times in each drying-curing zones.

| Pass No. | Applicator | Dry-coated thickness, mils. | Zone No. 1 (2 min.) | Zone No. 2 (2 min.) | Zone No. 3 (4 min.) |
|---|---|---|---|---|---|
| 1 | Blunt knife | 7.5–7.75 | 200°F. | 300°F. | 475°F. |
| 2 | Blunt knife | 7.5–7.75 | 200°F. | 300°F. | 450°F. |
| 3 | No. 35 Wire Wound rod | 8.0–8.25 | 200°F. | 270°F. | 435°F. |
| 4 | No. 35 rod | 8.5–8.75 | 200°F. | 260°F. | 400°F. |
| 5 | No. 35 rod | 9.0–9.25 | 200°F. | 250°F. | 380°F. |

The final dry resin content of the impregnated fabric was about 40 percent with a volatile content of 3 percent.

A clad laminate, with copper on each side, 12 × 12 inches in size, having a void content of 6.5 percent, as measured by mercury instrusion on the laminate, was made from the aforementioned impregnated fabrics by laminating 8 plies of the impregnated fabrics and to each side of the 8 plies 1 oz./ft.² treated copper in a press at 1000 psi — and 550°F. for 30 minutes followed by 675°–700°F. for 20 minutes. The clad laminate was then cooled at 1000 psi. The clad laminate was subjected to 300°C. for 24 hours and 400°C. for 30 minutes without blistering.

EXAMPLE 4

A clad laminate was prepared in accordance with the procedure of Example 3 having a void content as measured by mercury intrusion of 6.2 percent. An 18 × 34 inches piece of the laminate was exposed in an oven to a temperature of 300°C. for 16 hours without blistering.

EXAMPLE 5

An impregnated fabric was made from No. 112 glass fabric with A-1100 finish and coated with the precursor as in Example 3 using the method below:

| Pass No. | Applicator | Dry-coated thickness, mils. | Zone No. 1 1.5 min. | Zone No. 2 1.5 min. | Zone No. 3 |
|---|---|---|---|---|---|
| 1 | Sharp knife | 4.0–4.5 | 200°F. | 300°F. | 400°F. |
| 2 | Sharp knife | 4.25–4.75 | 200°F. | 300°F. | 400°F. |
| 3 | Blunt knife | 4.75–5.25 | 200°F. | 300°F. | 400°F. |
| 4 | No. 35 rod | 5.5–6.0 | 200°F. | 300°F. | 400°F. |
| 5 | No. 70 rod | 7.0–7.5 | 200°F. | 300°F. | 475°F. |
| 6 | No. 70 rod | 8.5–9.0 | 200°F. | 300°F. | 550°F. |

The final dry resin content of the impregnated fabric was about 70 percent with a volatile content of 4 percent.

This impregnated fabric was used to make a laminate as in Example 3 copper clad on each side, 3 × 3 inches in size, having a void content of 3.2 percent as measured by the mercury intrusion method. The laminate was exposed to 300°C. for 24 hours without blistering. However, a sample 9 × 6 inches in size having the same void content as measured by mercury intrusion, blistered on exposure to 300°C. for 4 hours.

We claim:

1. A structure comprising at least one layer of fibrous sheet material impregnated with a polyimide, said structure characterized by having a void volume of at least 3.5 percent and not more than 10 percent as measured by mercury intrusion, substantially all said voids occurring in and around the fibrous sheet material as channels running through the fibrous sheet material.

2. The structure of claim 1 wherein the fibrous sheet material is comprised of glass fiber.

3. The structure of claim 1 wherein any such layers contain inert colloidal particles dispersed therein.

4. The structure of claim 1 wherein the polyimide is a reaction product of benzophenone tetracarboxylic acid dianhydride and metaphenylene diamine or oxydianiline and the inert, thermally stable, colloidal particles are colloidal silica.

5. The structure of claim 1 having a void volume of not greater than about 7 percent as measured by mercury intrusion.

6. The structure of claim 1 consisting essentially of one layer consisting essentially of a fibrous sheet material impregnated with a polyimide.

7. The structure of claim 1 comprising a plurality of layers, at least one of the outermost layers thereof bearing on at least part of at least one of its surfaces a metal.

8. The structure of claim 7 wherein each outermost face surface of the outermost layers bears on at least part of its surface a metal.

* * * * *